US010547227B2

(12) United States Patent
Hauck et al.

(10) Patent No.: US 10,547,227 B2
(45) Date of Patent: Jan. 28, 2020

(54) ELECTROMAGNETIC STRUCTURE OF AN ELECTRIC MACHINE AND ELECTRIC MACHINE

(71) Applicant: BROSE FAHRZEUGTEILE GMBH & CO. KOMMANDITGESELLSCHAFT, WUERZBURG, Wuerzburg (DE)

(72) Inventors: Peter Hauck, Gerbrunn (DE); Oliver Haupt, Hain (DE); Maximilian Knopf, Wuerzburg (DE); Stefan Portner, Wuerzburg (DE)

(73) Assignee: Brose Fahrzeugteile GmbH & Co. Kommanditgesellschaft, Wuerzburg, Wuerzberg (DE)

( * ) Notice: Subject to any disclaimer, the term of this patent is extended or adjusted under 35 U.S.C. 154(b) by 0 days.

(21) Appl. No.: 15/262,043

(22) Filed: Sep. 12, 2016

(65) Prior Publication Data

US 2016/0380503 A1    Dec. 29, 2016

Related U.S. Application Data

(63) Continuation of application No. PCT/EP2015/054872, filed on Mar. 10, 2015.

(30) Foreign Application Priority Data

Mar. 10, 2014  (DE) .................. 10 2014 003 055

(51) Int. Cl.
*H02K 3/28* (2006.01)
*H02K 3/38* (2006.01)
(Continued)

(52) U.S. Cl.
CPC ............. *H02K 3/522* (2013.01); *H02K 1/146* (2013.01); *H02K 3/28* (2013.01); *H02K 3/38* (2013.01); *H02K 3/50* (2013.01); *H02K 2203/06* (2013.01)

(58) Field of Classification Search
CPC .. H02K 3/50; H02K 3/51; H02K 3/52; H02K 3/521; H02K 3/522; H02K 3/38;
(Continued)

(56) References Cited

U.S. PATENT DOCUMENTS 6,674,195 B2   1/2004  Yagyu et al.
7,262,529 B2   8/2007  Klappenbach et al.
(Continued)

FOREIGN PATENT DOCUMENTS

CN    1862925 A    11/2006
DE    19961339 A1   7/2001
(Continued)

OTHER PUBLICATIONS

Toliyat et al., Handbook of Electric Motors, 2004, CRC Press, Taylor & Francis Group, Second Edition, p. 201.*
JP 2002051519 A (English Translation).*

*Primary Examiner* — Mang Tin Bik Lian
*Assistant Examiner* — Alexander Moraza
(74) *Attorney, Agent, or Firm* — Laurence A. Greenberg; Werner H. Stemer; Ralph E. Locher (57) ABSTRACT

An electromagnetic structure of an electric machine, in particular an adjustment drive of a motor vehicle, has a plurality of coils which are arranged to form a circular structure. Each of the coils has a coil winding and a connection. The coils are respectively electrically connected in pairs by way of a conductor bridge which is in contact with the respective connections. Each conductor bridge is arranged at an axial distance from the associated coils, each (Continued)

conductor bridge being arranged at least partially in a receiving element of a guiding plate.

11 Claims, 6 Drawing Sheets

(51) Int. Cl.
    *H02K 3/50* (2006.01)
    *H02K 3/52* (2006.01)
    *H02K 1/14* (2006.01)

(58) Field of Classification Search
    CPC ........ H02K 3/46; H02K 3/28; H02K 2203/06; H02K 2203/09; H02K 15/0043; H02K 1/185; H02K 3/34; H02K 3/345
    USPC ........... 310/71, 416, 216.005, 179, 214, 194
    See application file for complete search history.

(56) References Cited

U.S. PATENT DOCUMENTS

| | | | |
|---|---|---|---|
| 7,430,796 B2 | 10/2008 | Baumgartner et al. | |
| 7,560,839 B2 | 7/2009 | Sumiya et al. | |
| 7,975,370 B2 | 7/2011 | Becherucci et al. | |
| 8,075,825 B2 | 12/2011 | Takahashi et al. | |
| 9,300,173 B2 | 3/2016 | Marschall | |
| 2001/0048262 A1* | 12/2001 | Takano | H02K 1/148 310/179 |
| 2005/0082940 A1* | 4/2005 | Knauff | H02K 3/522 310/260 |
| 2007/0103014 A1* | 5/2007 | Sumiya | F02M 37/048 310/71 |
| 2008/0157610 A1* | 7/2008 | Watanabe | H02K 3/522 310/43 |
| 2009/0230793 A1 | 9/2009 | Hirao | |
| 2010/0259119 A1* | 10/2010 | Wang | H02K 3/50 310/71 |
| 2012/0256514 A1* | 10/2012 | Junak | H02K 1/146 310/216.092 |
| 2013/0154413 A1* | 6/2013 | Schweichart | H02K 7/1166 310/88 |
| 2013/0162098 A1* | 6/2013 | Furuhashi | H02K 3/38 310/215 |
| 2013/0193799 A1* | 8/2013 | Marschall | H02K 3/522 310/208 |
| 2013/0200742 A1* | 8/2013 | Seki | H02K 3/28 310/195 |

FOREIGN PATENT DOCUMENTS

| | | | |
|---|---|---|---|
| DE | 10261611 A1 | 7/2004 | |
| DE | 10318816 A1 | 11/2004 | |
| DE | 102005002364 A1 | 7/2006 | |
| DE | 102010063304 A1 | 2/2012 | |
| DE | 102012020547 A1 | 4/2014 | |
| EP | 1184957 A2 | 3/2002 | |
| EP | 1372242 A2 | 12/2003 | |
| EP | 1783880 A2 | 5/2007 | |
| JP | 2002051519 A * | 2/2002 | ............ H02K 1/148 |
| JP | 2004112856 A | 4/2004 | |
| JP | 2006512884 A | 4/2006 | |
| JP | 2007129847 A | 5/2007 | |
| JP | 2007267439 A | 10/2007 | |
| JP | 2008167604 A | 7/2008 | |
| JP | 2009303420 A | 12/2009 | |
| JP | 2014039455 A | 2/2014 | |
| KR | 1020050084496 A | 8/2005 | |
| KR | 1020100047266 A | 5/2010 | |

* cited by examiner

ELECTROMAGNETIC STRUCTURE OF AN ELECTRIC MACHINE AND ELECTRIC MACHINE

CROSS-REFERENCE TO RELATED APPLICATION

This application is a continuation, under 35 U.S.C. § 120, of copending international application No. PCT/EP2015/054872, filed Mar. 10, 2015, which designated the United States; this application also claims the priority, under 35 U.S.C. § 119, of German patent application No. DE 10 2014 003 055.5, filed Mar. 10, 2014; the prior applications are herewith incorporated by reference in their entirety.

BACKGROUND OF THE INVENTION

Field of the Invention

The invention relates to an electromagnet structure of an electric machine, in particular an adjustment drive of a motor vehicle. The electromagnet structure has a plurality of coils that are arranged in a circular structure.

Adjustment drives for motor vehicles, in particular power steering arrangements, are typically embodied in the form of an electric motor. Electric motors of this type are operated by way of a three-phase current. They comprise a fixed stator having an electromagnet structure that comprises a number of coils that are arranged as magnetic poles in a circular structure. The coils comprise in each case a coil winding and a connector that are produced from an electrically conductive material. The coil windings of the electromagnet structure are preferably in each case wound onto a coil body that is not electrically conductive. A rotor is arranged in a rotatable manner in the interior of the electromagnet structure, said rotor itself being provided with a coil winding or field winding in the case of a brushless electric motor having permanent magnets and in the case of a so-called commutator motor. If an electrical current flows through the phase windings that are formed by the stator-side coils, an exciter field that interacts with the magnetic field of the rotor is thus built up, as a result of which the rotor rotates about its rotor axis.

Generally, in each case, two of the coils are connected together as a coil pair, wherein a conductor track is electrically contacted by means of the respective connectors. In the case of a vibration of the electromagnet structure, it is possible for conductor bridges of coil pairs of different phases to make physical contact with one another in an electrically conductive manner. The phase connections that occur cause a malfunction of the electric motor and an undesired, safety critical, increased braking torque, in particular when steering in the case of power steering applications.

Generally, in order to avoid this phase connector problem, the conductor bridges are covered by a non-electrically conductive insulating tube of synthetic material. As a consequence, an additional production step is created when producing the stator system, which negatively influences the production costs and the duration of the production process of the stator system.

SUMMARY OF THE INVENTION

It is accordingly an object of the invention to provide an electromagnet circuit structure for an electric machine which overcomes the above-mentioned and other disadvantages of the heretofore-known devices and methods of this general type and which is a particularly suitable electric machine that is simple and expediently cost-effective to produce, wherein safety is advantageously increased.

With the foregoing and other objects in view there is provided, in accordance with the invention, an electromagnet structure of an electric machine, in particular for an adjustment drive motor of a motor vehicle. The novel electromagnet structure comprising:

a plurality of coils disposed in a circular arrangement;
each of said coils having a coil winding and a connector;
conductor bridges connected to respective said connectors and electrically connecting said coils in pairs;
a guiding plate formed with receiving arrangements;
wherein each said conductor bridge is spaced in an axial direction from associated said coil windings; and
wherein each said conductor bridge is arranged at least in part in a respective said receiving arrangement of said guiding plate.

The electromagnet structure is a component of an electric machine. The electric machine is in particular an electric motor, wherein the electric motor comprises brushes (commutator motor) or it is a brushless motor. Expediently, the electric motor is a component of an adjustment drive of a motor vehicle, wherein it is preferred that a power steering arrangement comprises the adjustment drive. The electromagnet structure comprises a number of coils having in each case a coil winding that is produced from an electrically conductive material. The coil windings are produced by way of example from a coated copper wire. Moreover, each coil comprises a connector that makes contact in an electrical manner with the coil winding and is expediently embodied as one part with said coil winding. In particular, the coil windings are wound onto a coil body that is embodied from a non-electrically conductive material which increases its stability. The coils are arranged in a circular structure, wherein the central openings of the coil windings are oriented radially. In other words, the arrangement of the coil body comprises a hollow cylindrical shape. The axial direction of the electric machine is parallel to the axis of rotation that coincides with the axis of the electromagnet structure. The connector of each coil is in particular arranged in the axial direction of the respective coil winding.

Adjacent coil windings are expediently electrically insulated with respect to one another, by way of example the coil windings are spaced with respect to one another, an electrical insulator is expediently arranged within the space that is formed in this manner. The insulator is in particular a synthetic material or air. Two coil windings of the electromagnet structure are electrically connected to one another as a coil pair by means of in each case a conductor bridge, also known as a wire bridge, wherein the coil windings are expediently not directly adjacent to one another. The conductor bridge is for this purpose contacted by means of the respective connectors of the coils. The conductor bridges are expediently embodied as one part with the respective connectors and in particular with the allocated coil windings. The production is simplified in this manner. The conductor bridges are spaced in the axial direction with respect to the allocated coil windings. It is preferred that all the conductor bridges are located in the axial direction on a common side of the coil windings.

The electromagnet structure comprises a guiding plate having a number of receiving arrangements that corresponds to the number of conductor bridges. In the assembled state, a conductor bridge is arranged in each receiving arrangement and/or is fixed in said receiving arrangement. It is preferred that the conductor bridges are fastened in the receiving arrangements in a clamping manner. A comparatively simple assembly is rendered possible by means of inserting the conductor bridge into the corresponding receiving arrangement, wherein the conductor bridge is held in a comparatively secure manner. Each receiving arrangement is expediently formed by means of a groove. The cross section of the groove-shaped receiving arrangement is expediently adjusted to suit the cross section of the conductor bridges. In particular, the cross section of each conductor bridge is circular and the cross section of each groove is essentially a segment of a circle greater than 180°. In this manner, it is rendered possible for the conductor bridge to lie in a non-positive locking manner within the respective receiving arrangement. In other words, when assembling the electromagnet structure each conductor bridge is snapped into the respective corresponding receiving arrangement. Owing to the fastening of this type, it is possible to omit an aid of adhesive materials during the assembly procedure.

The guiding plate is preferably produced from a non-electrically conductive material, in particular a synthetic material, and/or is embodied as a single part. In particular, the guiding plate is arranged at least in part between the coil windings and the conductor tracks. In this manner by means of the guiding plate, a spacing of the conductor bridges and consequently a galvanic separation between said bridges is ensured, wherein during production it is only necessary to assemble one component, namely the guiding plate.

The position of the conductor bridge is stabilized owing to the use of the guiding plate and said conductor bridges are prevented from moving towards further electrically conductive components, in particular an adjacent conductor bridge, when operating the electric machine. Furthermore, the coil pair can be wound and constructed without an additional production step owing to the use of the guiding plate. As a consequence, the production costs of the electromagnet structure advantageously decrease.

The guiding plate is preferably arranged on the side of a B-side bearing plate, in other words opposite a shaft output of the electric machine. In this manner, damage to the conductor bridges and/or the guiding plate is avoided when assembling the electric machine and when coupling the shaft to the further components. It is preferred that the conductor bridges are arranged in the axial direction between an electronic system and the coil windings. The electromagnet structure is expediently a component of a stator and/or comprises between ten and 16 coils. In particular, the electromagnet structure comprises twelve coils and six conductor bridges.

In a preferred embodiment, the receiving arrangements are spaced in relation to the coil windings. If the electric machine is an internal rotor and the electromagnet structure is a component of a stator, the receiving arrangements are expediently offset towards the interior, in other words consequently comprise a smaller spacing with respect to the axis of rotation than the coil windings. In a preferred embodiment, the guiding plate comprises a central aperture that is in particular concentric with the circular structure. In particular, the guiding plate is formed in the region of the aperture in a hollow cylindrical manner. The receiving arrangements are preferably arranged on the peripheral surface of the hollow cylinder that is formed in this manner, and consequently are offset radially inwards towards the coil bodies. The receiving arrangements extend by way of example essentially tangentially with respect to the circular structure in an embodiment of this type.

In a suitable further development, the guiding plate comprises a star with radially oriented projections, wherein each of the projections is arranged within one of the coil windings. In this manner, a positioning of the coils and the guiding plate is simplified. By way of example, the projections are oriented radially inwards. The free end consequently comprises a smaller spacing with respect to the axis of rotation than the remaining regions of the star. However, it is preferred that the projections are aligned radially outwards and the free ends of the projections form in the radial direction the outer limit of the star. In this manner, an assembly of the coils is simplified.

Expediently, each of the projections comprises a resilient element by means of which the respective coil can be fixed in a clamped manner. Consequently, the one assembly of the coils is simplified. In preferred further development, the resilient element comprises a leaf spring that is in particular oriented radially. Expediently, the leaf spring is embodied as one part with the respective projection, which reduces the production costs. Advantageously, each coil comprises a contour that corresponds to the guiding element and the resilient element is latched in the assembled state by means of said contour. Expediently, a non-positive locking connection is produced between the coils and the guiding plate by means of the resilient elements. As a consequence, a movement of said coils and guiding plate with respect to one another is prevented and a noise loading and also material loading is reduced.

In one advantageous embodiment, the star is in particular in direct mechanical contact with a laminated core, wherein the laminated core in a preferred embodiment is the stator laminated core. Initially, during production the guiding plate is attached to the stator laminated core and subsequently the coil windings are plugged onto the projections of the star and of the stator laminated core. During the plugging procedure or when assembling in the radial direction, it is to be noted that the initially taut wire of the conductor bridge between the coil pairs during the plugging procedure initially hangs loose between the coil pairs. The conductor bridge is positioned in the receiving arrangement in a subsequent procedure.

In a suitable further development, the shape of the star is identical to the shape of a lamina of the laminated core. In the assembled state, the star expediently lies flush on the laminated core, and the projections expediently align with the teeth of the laminated core. In particular, during the assembly procedure the star of the guiding plate is stacked according to a type of last or final lamina and in this manner the composite of laminated core and the guiding plate is produced.

In summary, the coil bodies are preferably arranged on teeth of the laminated core. In other words, each tooth is arranged within in each case a coil winding. The teeth preferably extend radially so that the laminated core is embodied in a star shape. The two coil windings of each coil pair are preferably located on teeth that are offset by essentially 90° in the circular structure with respect to one another. The guiding plate is expediently located between the conductor bridges and the core of the laminated core that is facing the conductor bridges. In particular, the guiding plate lies on the laminated core and is consequently in direct mechanical contact with the laminated core.

The receiving arrangements are advantageously distributed into two groups that are arranged in a point symmetrical manner in relation to the axis of rotation. In a particularly advantageous embodiment, the receiving arrangements are arranged axially. In other words, the receiving arrangements run and/or extend in the axial direction. The receiving arrangements are themselves spaced tangentially with respect to one another so that the conductor bridges are likewise spaced tangentially with respect to one another. Each receiving arrangement is expediently formed by means of a groove that extends in the axial direction. By way of example, the guiding plate comprises a number of retaining arms that corresponds to the number of receiving arrangements or the number of conductor bridges, said retaining arms in each case comprising a retaining element. One of the conductor bridges is fixed by means of each retaining element. The retaining elements are in particular radially extending slots, notches or grooves. Consequently, each conductor bridge is fixed by means of in each case one of the retaining elements and one of the receiving arrangements so that a movement of the conductor bridges is limited. In summary, each conductor bridge and consequently likewise each receiving arrangement is allocated precisely one retaining element. Expediently, each retaining element is located in an end region of the allocated conductor bridge and the corresponding receiving arrangement is located in the remaining end region of this conductor bridge. Each receiving arrangement is advantageously spaced tangentially with respect to the corresponding retaining element and is in particular offset essentially by 90° in relation to the axis of rotation however at least by for example 80°, 85°, 95° or 100°.

In a preferred further development, each retaining arm is tangentially and radially offset in comparison to the corresponding receiving arrangement, in particular towards the outside. As a consequence of which, the conductor bridges likewise extend radially and tangentially and a mechanical contact between the conductor bridges can be prevented. By way of example, the direction and/or extent of the offset of all the retaining arms in relation to their allocated receiving arrangement is constant. The conductor bridges are expediently identically oriented and extend in sections in parallel. In particular, the conductor bridges at least do not cross one another. Each retaining arm is advantageously offset in the axial direction in relation to the connector with which the conductor bridge that is fixed by means of the retaining arm is electrically contacted. In particular, the retaining element of each retaining arm covers one of the allocated connectors in the axial direction. In other words, the projection of each connector in the axial direction on the retaining arms is at least in part within one of the retaining elements. Each connector expediently extends essentially axially to the contact site with the respective conductor bridge and each conductor bridge likewise extends in an axial manner between the respective contact site and the allocated retaining element. In this manner, a guiding arrangement and assembly of the conductor bridges is simplified. The retaining arms are advantageously distributed in two groups that are essentially arranged in a point symmetrical manner in relation to the axis of rotation. At least, the position of the retaining elements is point symmetrical in relation to the axis of rotation.

Consequently, the conductor bridges are located in a plane that is offset in relation to the coil windings in the axial direction, wherein the conductor bridges preferably comprise a substantially tangential and radial extent. In other words, the conductor bridge is guided over all the coil windings that are located between the two coil windings of a coil pair, and each coil winding is spaced with respect to the conductor track and consequently electrically insulated, in particular by means of the retaining arms.

In an alternative embodiment, the receiving arrangements extend axially and tangentially. In other words, a helical shape is embodied by means of the receiving arrangements provided that the receiving arrangements are embodied as grooves. In this embodiment, the receiving arrangements advantageously extend approximately in a coil shape or helical shape according to a type of outer thread on the hollow cylinder surface provided that the hollow cylinder is present. Consequently, the receiving arrangements are inclined at an inclination angle with respect to the axial direction. In particular, the receiving arrangements extend at least in part in the axial direction adjacent to one another. In an advantageous embodiment, the receiving arrangements are spaced in the axial direction at least in sections with respect to the coil windings and in particular in relation to the star of the guiding plate, provided said star is present. In this manner, the conductor bridges are guided away from the coil bodies by means of the receiving arrangements and consequently are spaced so that said conductor bridges are prevented from coming into contact with each other or are prevented from moving closer to one another which could cause an electrical flashover.

In a preferred embodiment, the receiving arrangements extend radially and also tangentially. As a consequence, a guiding arrangement geometry for the conductor bridges is provided on the guiding plate with which an as simple as possible assembly is ensured. Furthermore, the conductor bridges are consequently positioned in a safe spacing with respect to one another. In an advantageous manner, the receiving arrangements are distributed into at least two groups, wherein the, in particular constant, spacing between the receiving arrangements of the same group is smaller than the spacing with respect to the receiving arrangements of a remaining group. Consequently, the conductor bridges are spaced comparatively far from one another, wherein an efficient winding of the coil bodies of the electromagnet structure is rendered possible.

In a preferred implementation, the electric machine is an adjustment drive of a motor vehicle. It is preferred that the adjustment drive be a servo drive of a motor vehicle steering system. The electric machine comprises an electromagnet structure having a plurality of coils that are arranged in a circular structure, the coils in each case comprising a coil winding and a connector. The coils are in each case electrically connected to one another in pairs by way of a conductor bridge. Each conductor bridge is contacted by way of the respective connector. Each conductor bridge is spaced in the axial direction from the allocated coils, wherein each conductor bridge is arranged at least in part in a receiving arrangement of a guiding plate. In particular, the electromagnet structure is a component of a stator of the electric machine that is embodied as an electric motor that is advantageously brushless.

Other features which are considered as characteristic for the invention are set forth in the appended claims.

Although the invention is illustrated and described herein as embodied in a electromagnetic structure of an electric machine and in an electric machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Parts and dimensions that correspond to one another are provided with identical reference numerals and symbols throughout the figures.

DETAILED DESCRIPTION OF THE INVENTION

Figure 1:
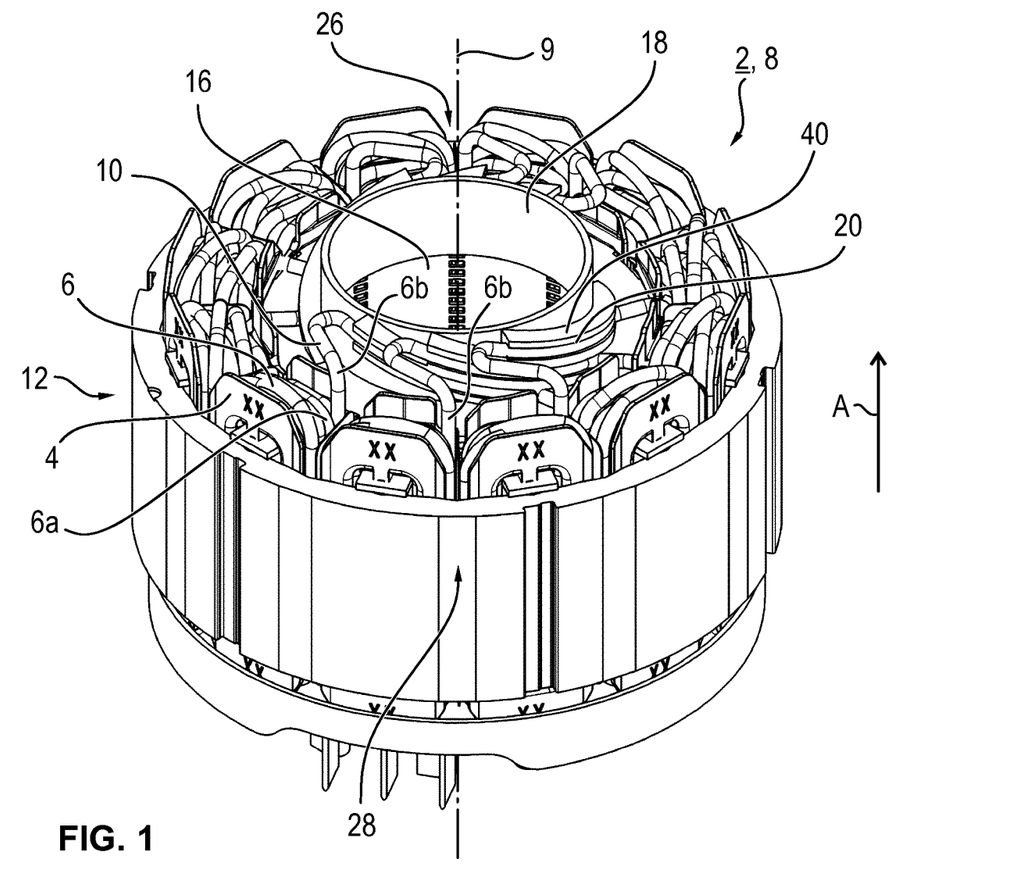
FIG. 1 illustrates in a perspective view an electromagnet structure having twelve coils and having a guiding plate.
Figure 2:
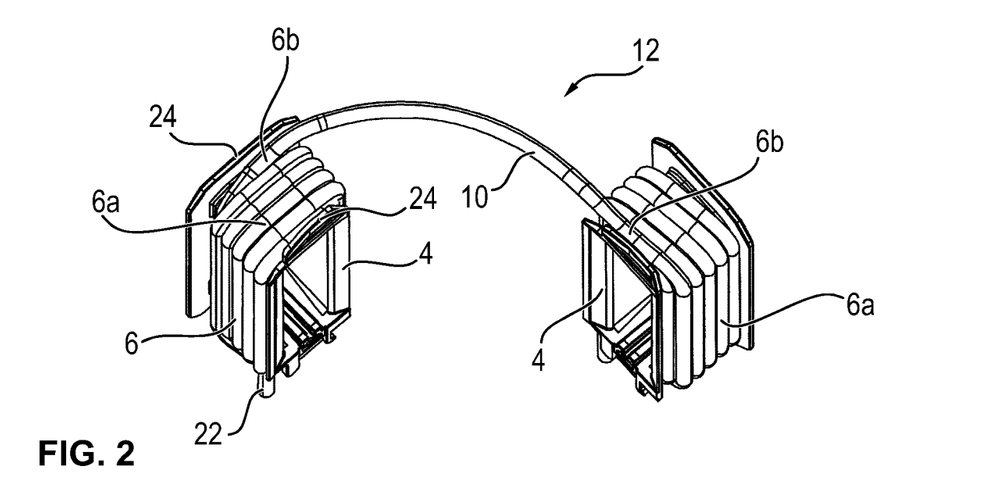
FIG. 2 is a perspective view of a coil pair.

Referring now to the figures of the drawing in detail and first, particularly, to FIG. 1 thereof, there is shown an electromagnet structure 2 of an electric motor. The latter is not further illustrated in the figure. The electromagnet structure 2 is a component of a stator of the electric motor. The electromagnet structure 2 comprises twelve coil bodies 4 that are embodied from a synthetic material and onto which is wound in each case a coil 6. The coils 6 are in particular produced from a coated copper wire and comprise in each case a coil winding 6a and a connector 6b (FIG. 2).

The coil body 4 and the coils 6 are arranged in an annular circular structure 8. A rotor of the electric motor is mounted in such a manner that it can rotate within the interior of the circular structure 8 in the assembled state. The rotor thereby rotates about an axis of rotation 9 during the operation owing to an exciter field of the electromagnet structure 2. In each case, two coils 6 are electrically connected in an electrically conductive manner by means of a conductor track 10 and are combined as an assembly into a coil pair 12 (FIG. 2). Each conductor bridge 10 is electrically contacted by means of the connectors 6b of the respective coils 6. The respective conductor bridge 10 is embodied as one part with the corresponding coils 6. In the figures in each case only one coil pair assembly 12 of this type is provided with reference numerals in an exemplary manner.

The coil pairs 12 are oriented in such a manner that the central apertures of the coil body 4 are oriented radially towards the circular structure 8. The axial direction A of the electric motor and the hollow cylindrical circular structure 8 is parallel to the axis of rotation 9.

The six cascading coil pairs 12 are energized when operating the electric motor by an electric three-phase current and they form six magnetic pole regions of the electromagnet structure 2. The coil pairs 12 of the electromagnet structure 2 are connected in series or in parallel to one another. The conductor bridge 10 of each coil pair 12 extends substantially in the direction of the axis of rotation 9.

The coil bodies 4 are arranged on the stator teeth (not further illustrated) of a stator laminated core 16, wherein the stator teeth are embodied as radially extending star-shaped projections of the stator laminated core 16. In other words, the projections are located within the central aperture of each coil body 4 and the coil winding 6a that is wound onto said coil body. The two coil windings 6a of each coil pair 12 is positioned on stator teeth that are offset by essentially 90° with respect to one another in relation to the axis of rotation 9.

A guiding plate 18 having a number of groove-shaped receiving arrangements 20 that corresponds to the number of conductor bridges 10 is arranged on the stator laminated core 16, wherein the guiding plate 18 lies on the stator lamina of the stator laminated core 16, said stator lamina being arranged in the axial direction A on the side of a B-side bearing plate. The guiding plate 18 is in other words arranged with respect to a shaft output of the electric motor. The guiding plate 18 is produced from a non-electrically conductive synthetic material. In the assembled state—as is evident in FIG. 1—a conductor bridge 10 is arranged in each of the receiving arrangements 20 and is fixed in said receiving arrangement in a clamped manner. The guiding plate 18 is consequently arranged at least in part in the axial direction A between the coil windings 6a and the conductor bridges 10.

FIG. 2 illustrates details of a coil pair 12 in an exemplary embodiment. The coils 6 comprise in each case a contacting end 22 that is connected to the connector 6b by means of the respective coil winding 6a in an electrically conductive manner and is embodied as one part with said coil winding. The contacting ends 22 are coupled to a control device (not further illustrated) and a current source of the electric motor so as to control and supply the electromagnet structure 2. The two connectors 6b are electrically contacted by means of the conductor bridge 10. During production, the two coils 6 and the conductor bridge 10 are wound from a common wire. The coils 6 and also the conductor track 10 are consequently embodied as one part from a copper wire that is wound around the coil body 4 using a single tooth winding technique. The coil bodies 4 are essentially rectangular injection molded components that are embodied from non-electrically conductive synthetic material and comprise a retaining wall 24 in the radial direction towards the inner and outer circumference of the circular structure 8. The coil body 4 consequently comprises an essentially H-shaped cross section in the axial direction A, wherein the coil windings 6a are wound around the horizontal H-arm.

The contacting ends 22 consequently make contact with the adjacent coil pairs 12 of the same phase by way of a welding connection or solder connection, by means of a pressing procedure or the like. The electromagnet structure 2 essentially comprises—as is illustrated in FIG. 1—a first coil pair assembly 26 and a second coil pair assembly 28. The coil pair assemblies 26, 28 comprise in each case three coil pairs 12 that are electrically connected in series to one another in a cascaded manner in such a manner that during the operation each conductor bridge 10 of the coil pair assembly 26, 28 leads to a different current phase. The conductor bridges 10 are relocated in the region of the guiding plate 18 within the receiving arrangement 20 so as to galvanically separate the current phases between adjacent conductor bridges 10. As a consequence, the position of the conductor bridge 10 stabilizes and said conductor bridge is prevented from moving towards a further electrically conductive component, in particular an adjacent conductor bridge 10, during the operation of the electric motor.

Figure 3:
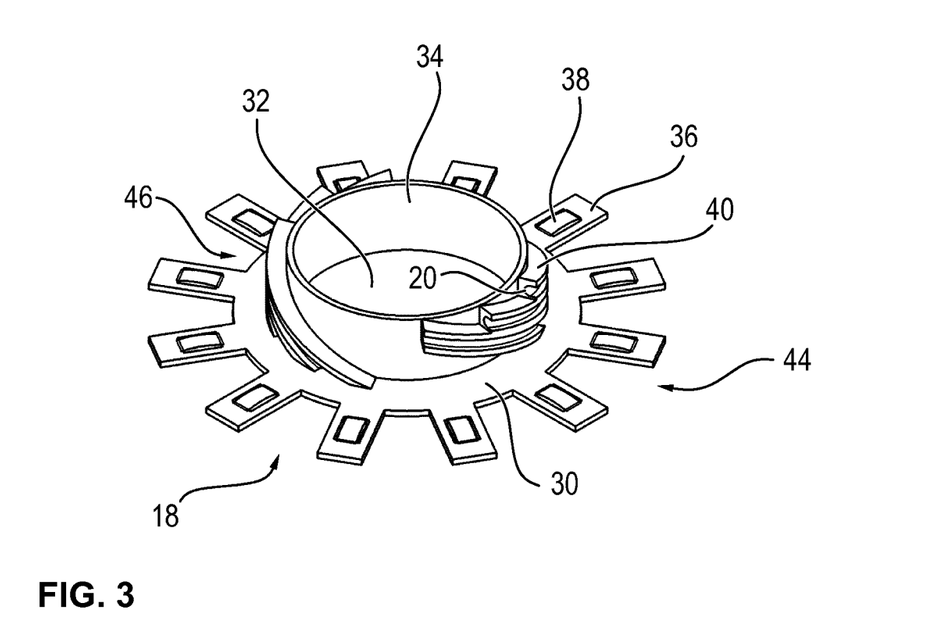
FIG. 3 is a perspective view of the guiding plate.
Figure 4:
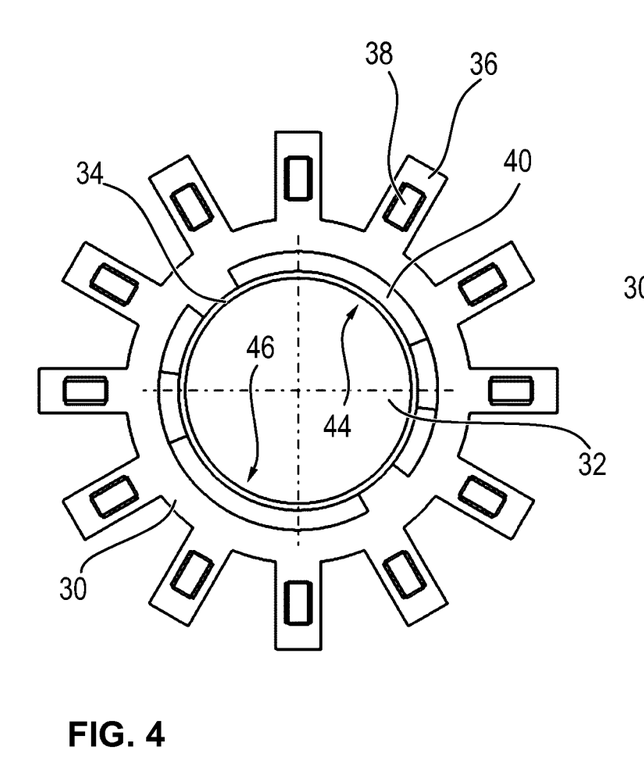
FIG. 4 illustrates in a plan view the guiding plate of FIG. 3.
Figure 5:
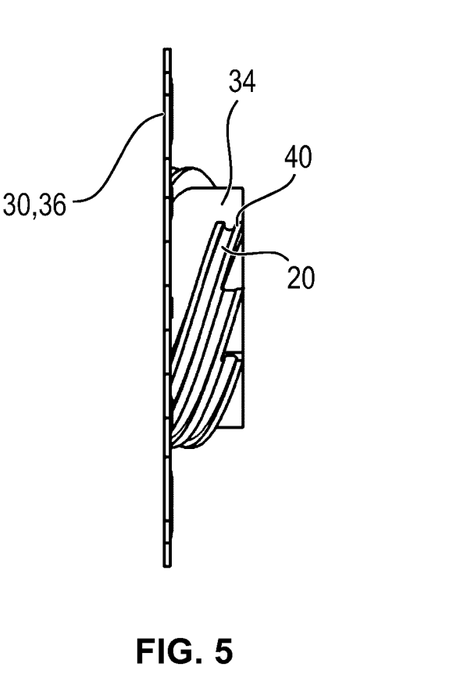
FIG. 5 illustrates in a side view the guiding plate of FIG. 3 or FIG. 4.
Figure 6:
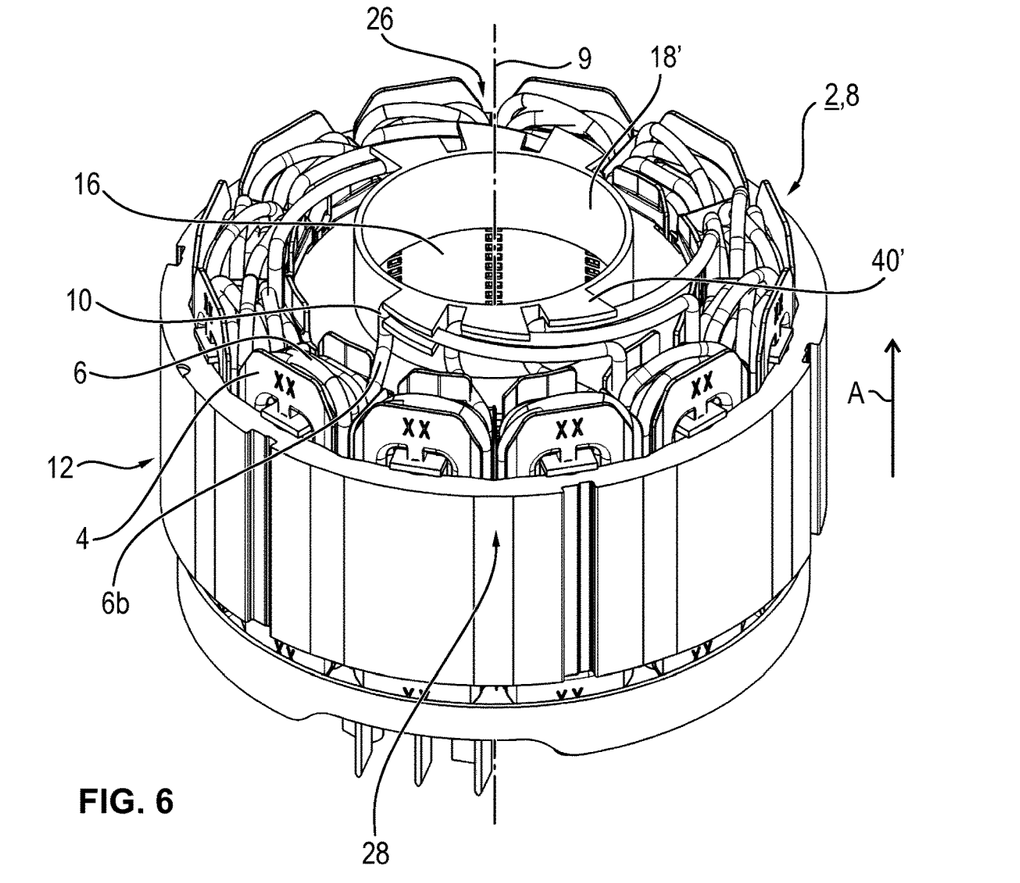
FIG. 6 illustrates in a perspective view a further embodiment of the electromagnet structure having a second embodiment of the guiding plate.
Figure 7:
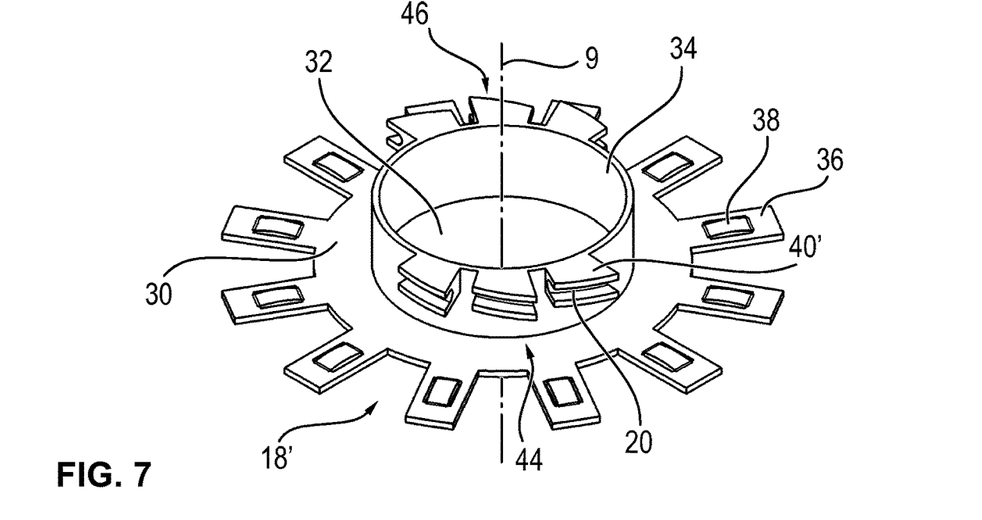
FIG. 7 illustrates in a perspective view the guiding plate of FIG. 6.
Figures 8, 9:
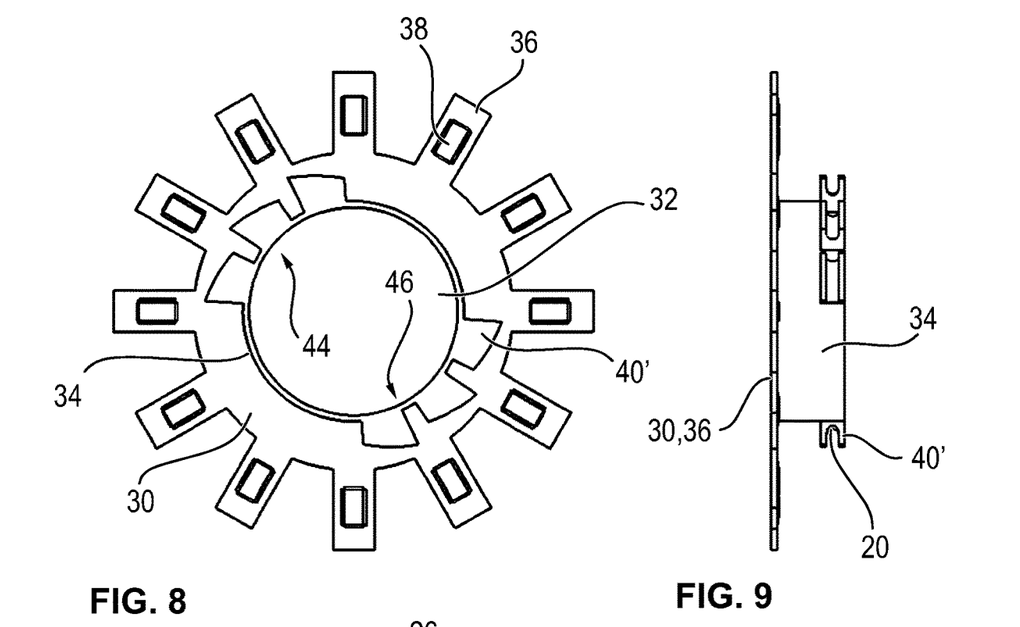
FIG. 8 illustrates in a plan view the guiding plate of FIG. 7.
FIG. 9 illustrates in a side view the guiding plate of FIG. 7 or FIG. 8.

A first embodiment of the guiding plate 18 according to a type of threaded guiding arrangement is illustrated in FIGS. 3 to 5. FIG. 3 illustrates the guiding plate 18 having a star-shaped star plate 30 and a hollow cylinder 34 that comprises a central hollow 32, said hollow cylinder being arranged in the axial direction A. The star plate 30 also comprises the circular hollow 32 in the center and is embodied as one part with the hollow cylinder 34.

The star plate 30 comprises twelve radially protruding projections 36 that are facing the coil bodies 4 and extend radially. The projections 36 of the star plate 30 are arranged on the stator laminated core 16 in the assembled state in such a manner that all the projections 36 align with the stator laminated core 16. Each projection 36 comprises a leaf spring 38 so as to achieve a clamping fastening arrangement of the coil body 4 in a non-destructive manner. In the figures, in an exemplary manner only one projection 36 and one leaf spring 38 are provided with a reference numeral.

Six radially protruding guiding profiles 40 are formed on the outer peripheral surface of the hollow cylinder 34 and in each case one of the receiving arrangements 20 is integrated into said guiding profiles. The guiding profiles 40 extend axially and tangentially so that the receiving arrangements 20 extend in a helical-shaped manner according to a type of outer thread. Consequently, the receiving arrangements 20 are oriented at an angle of inclination with respect to the axial direction A, wherein the receiving arrangements 20 of the coil assemblies 26, 28 are arranged at least in sections in the axial direction adjacent to one another. The angle of inclination is selected in such a manner that the receiving arrangements 20 extends on the half periphery of the hollow cylinder 34 essentially over its entire height. The conductor bridges 10 are consequently—as is illustrated in FIG. 1—guided and insulated essentially over their entire length by means of the receiving arrangements 20. The receiving arrangements 20 are tailored to suit the cross sectional shape of the conductor bridges 10, and comprise an essentially circular segment that is greater than 180° as a cross section. The guiding profiles 40 are arranged identically on the two half cylinder surfaces of the hollow cylinder 34, in other words in each case three guiding profiles 40 are oriented as one guiding profile group 44 and 46 to the corresponding coil assembly 26 and 28.

A second alternative embodiment of the guiding plate 18' according to a type of step guiding arrangement is explained hereinunder with reference to FIGS. 6 to 9. The construction of the guiding plate 18' is essentially identical to the construction of the guiding plate 18, wherein only the embodiment of the receiving arrangement 20 and the guiding profiles 40' varies. All six guiding profiles 40' that are formed on the hollow cylinder 34 are arranged in a plane perpendicular to the axial direction A and are spaced radially with respect to one another. The guiding profiles 40' comprise in the axial direction A an approximately trapezoidal cross section and are embodied as shorter in comparison to the guiding profiles 40'. The guiding profile groups 44, 46 are arranged spaced with respect to one another and extend owing to the altered geometry of the guiding profiles 40' only in each case over approximately a quarter of the circumference of the hollow cylinder 34. The guiding profiles 40' moreover protrude further in the radial direction than the guiding profiles 40. The receiving arrangements 20 are consequently likewise located in a plane perpendicular with respect to the axial direction A. The receiving arrangements 20 extend radially and tangentially. The conductor bridges 10 are consequently guided radially inwards by means of the receiving arrangements 20. The conductor bridges 10 are assembled by means of sliding the coils 6 onto the stator laminated core 16 and the guiding plate 18'.

A third embodiment of the guiding plate 18" is illustrated in FIGS. 10 to 13. In this embodiment variant, the guiding plate 18" comprises a number of retaining arms 48 and guiding ribs 50a, 50b that are formed on the hollow cylinder 34. The guiding ribs 50a, 50b are combined to form two guiding rib groups 52, 54 and the retaining arms 48 are combined to form two retaining arm groups 56, 58, wherein the groups are offset by 180° with respect to one another in relation to the axis of rotation. In contrast, the angle between adjacent retaining arms 48 and guiding ribs 50a, 50b of a common group is smaller and approximately 30°.

Figure 10:
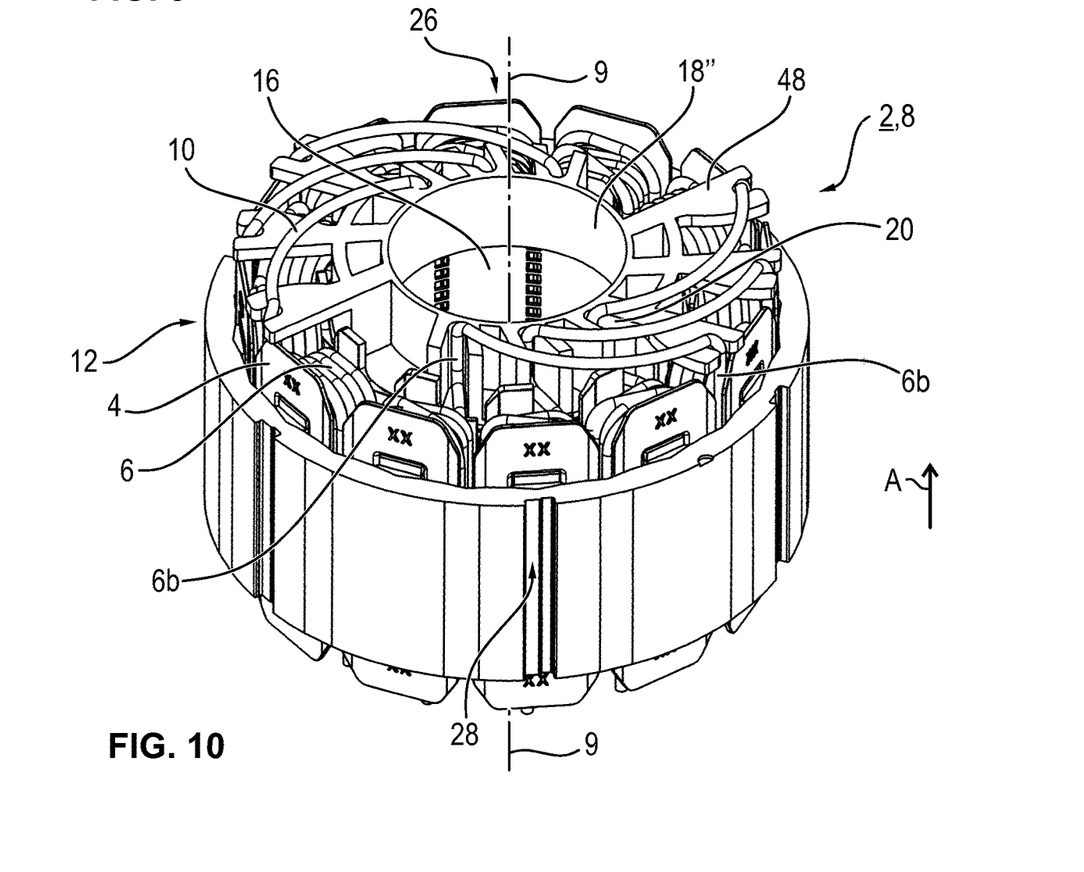
FIG. 10 is a perspective view of a further embodiment of the electromagnet structure having a third embodiment of the guiding plate.
Figure 12:
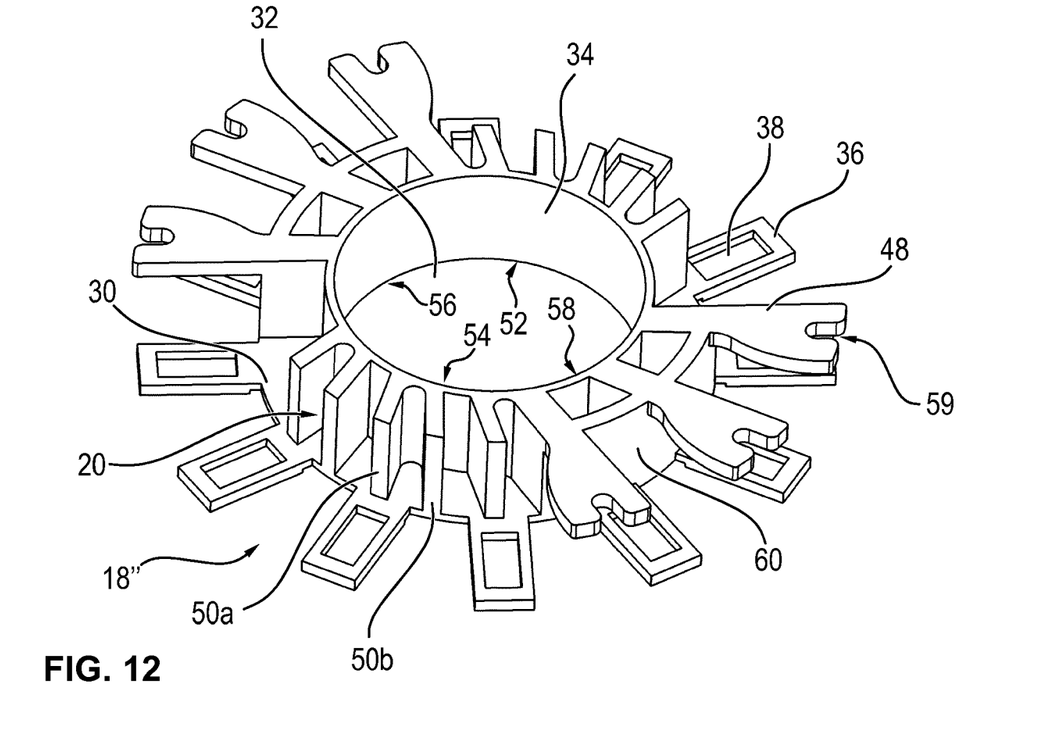
FIG. 12 is a perspective view of the guiding plate of FIG. 10.

The guiding ribs 50a, 50b are projections that point radially outwards and extend essentially in the axial direction A along the entire height of the hollow cylinder 34. Each guiding rib assembly 52, 54 comprises five guiding ribs 50, 50b, wherein the guiding rib assembly 52, 54 extends to approximately a quarter of the hollow cylinder circumference. In each case, three guiding ribs 50a align in a projection 36 of the star plate 30. A guiding rib 50b is arranged in each case approximately centrally between two adjacent guiding ribs 50a. In each case, a receiving arrangement 20 is formed by means of the intermediate space between the respective guiding ribs 50a, 50b. The retaining arm group 56, 58 connects in the peripheral direction to the guiding rib assembly 52, 54.

Figure 13:
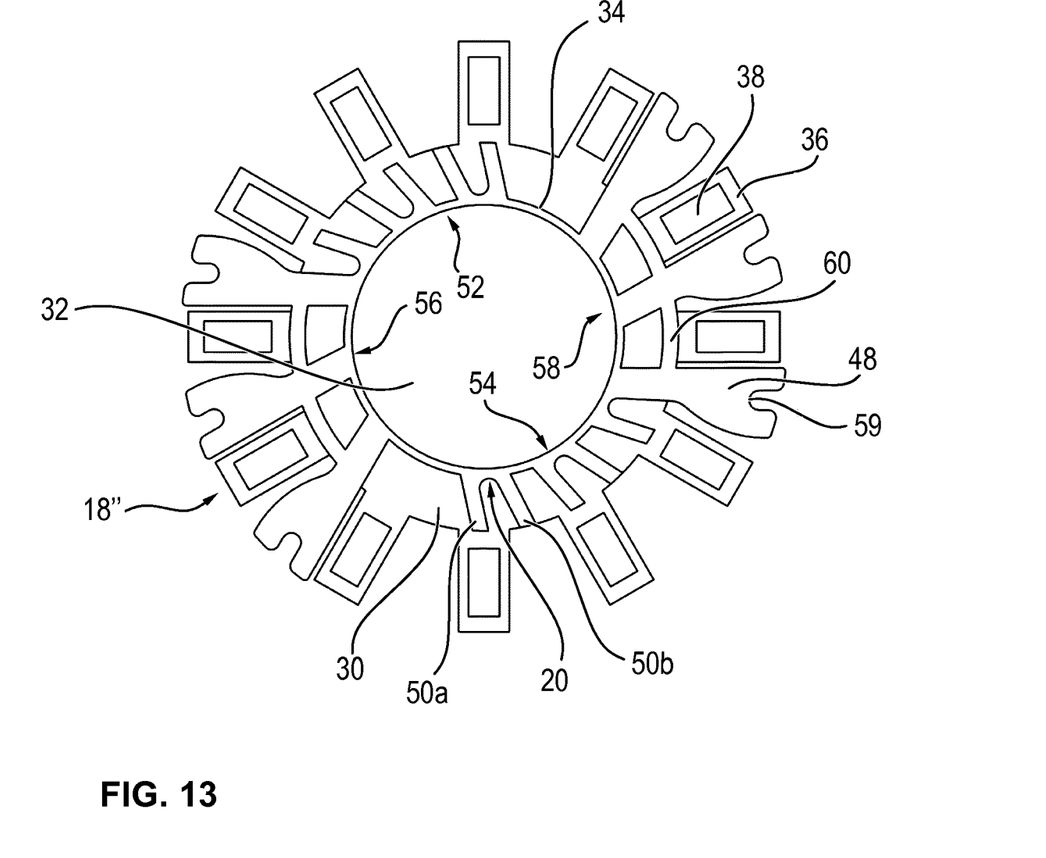
FIG. 13 is a plan view of the guiding plate of FIG. 11 or FIG. 12.

Each retaining arm group 56, 58 comprises three radially oriented, approximately Y-shaped retaining arms 48, wherein in each case the free end of the vertical Y arm is joined to the hollow cylinder 34. The retaining arms 48 lie in a plane that is parallel to the plane in which the projections 36 lie and that is perpendicular to the axial direction A. The retaining arms 48 are located on the end of the hollow cylinder 34 that lies opposite the star 30. In the tangential direction, the retaining arms 48 are arranged in each case between two adjacent projections 36 and extend in the radial direction from the hollow cylinder 34 to the periphery of the guiding plate 18" that is formed by means of the projections 36. A retaining element 59 in the form of a radial notch is formed between the two Y arms of each retaining arm 48. Circular segment-shaped side walls 60 are arranged between adjacent retaining arms 48 for an improved stability and the extension of said side walls in the axial direction A corresponds to that of the hollow cylinder 34. The side walls 60 align in the region between the projections 36 with the star plate 30 and are arranged approximately on the base of the Y arms.

Figure 11:
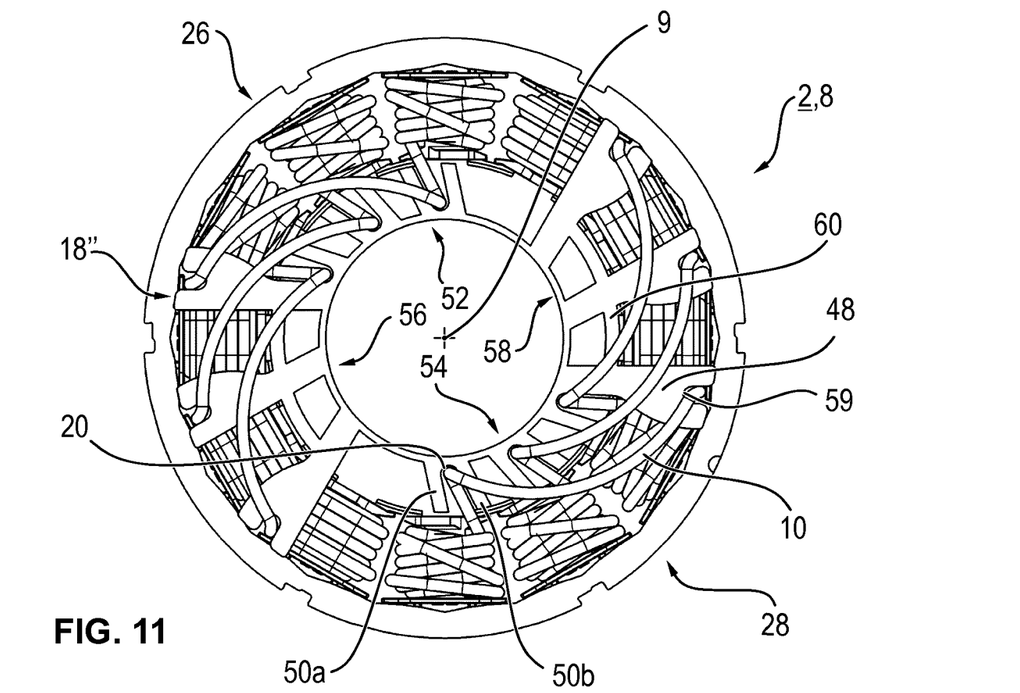
FIG. 11 is a plan view of the electromagnet structure of FIG. 10.

As is evident in FIG. 10, the conductor bridges 10 are held by means of the retaining elements 59 of the respective retaining arm 48, and extend—as illustrated in FIG. 11—in a spiral arm manner to in each case one of the receiving arrangements 20. In the region of the connector 6b of each coil pair 12, said connector lying radially outwards, the respective retaining element 59 is spaced in the axial direction A with respect to the respective connector 6b, however not in the tangential and radial direction. The wire that forms this connector 6b and the conductor bridges 10 is guided in a comparatively taut manner between the coil winding 6a, the retaining element 59 and the receiving arrangement 20 when forming inter alia the connector 6b. As a consequence of which, each conductor bridge 10 extends from the radially outer region in each case of one of the coils 6 to the radially inner region of a further one of the coils 6, wherein the conductor bridge 10 is pulled comparatively taut by means of the allocated receiving arrangement 20 and the allocated retaining element 59, which prevents said conductor bridge from coming into physical contact with a further conductor bridge 10. The individual connectors 6b of the coils 6 are also prevented from coming into contact with one another owing to on the one hand the taut tensioning arrangement and on the other hand owing to the guiding ribs 50a, 50b.

The invention is not limited to the above described exemplary embodiments. On the contrary, other variants of the invention can also be derived from said exemplary embodiments by the person skilled in the art without departing from the subject matter of the invention. In particular, moreover all the individual features that are described in conjunction with the various exemplary embodiments can also be combined in another manner with one another without departing from the subject matter of the invention.

The following is a summary list of reference numerals and the corresponding structure used in the above description of the invention:

2 Electromagnet structure
4 Coil body
6 Coil
6a Coil winding
6b Coil connector
8 Circular structure
9 Axis of rotation
10 Conductor bridge
12 Coil pair
16 Stator laminated core
18, 18', 18" Guiding plate
20 Receiving arrangement
22 Contacting end
24 Retaining wall
26 Coil assembly
28 Coil assembly
30 Star plate
32 Hollow
34 Hollow cylinder
36 Projection
38 Leaf spring
40, 40' Guiding profile
44 Guiding profile group
46 Guiding profile group
48 Retaining arm
50a, 50b Guiding rib
52 Guiding rib group
54 Guiding rib group
56 Retaining arm group
58 Retaining arm group
59 Retaining element
60 Side wall
A Axial direction

The invention claimed is:

1. An electromagnet structure of an electric machine, the electromagnet structure comprising:
a plurality of coils disposed in a circular arrangement;
each of said coils having a coil winding and a connector;
conductor bridges connected to respective said connectors and electrically connecting said coils in pairs;
a guiding plate formed with receiving arrangements;
wherein each said conductor bridge is spaced in an axial direction from associated said coil windings; and
wherein each said conductor bridge is arranged at least in part in a respective said receiving arrangement of said guiding plate;
wherein said receiving arrangements extend in an axial direction and are spaced tangentially with respect to one another, said guiding plate includes a given number of retaining arms corresponding to a number of said receiving arrangements, and each of said retaining arms has a retaining element disposed at a greater radial distance from a center of said guiding plate than said receiving arrangements,
wherein one of said conductor bridges is fixed by way of each retaining element; and
wherein said retaining elements are offset in the axial direction with respect to said connectors; and
wherein said receiving arrangements are disposed in the axial direction between said retaining arms and said coils.

2. The electromagnet structure according to claim 1, wherein said receiving arrangements are radially spaced relative to said coil windings.

3. The electromagnet structure according to claim 1, wherein each of said projections comprises a resilient element for fixedly clamping the respective said coil body.

4. The electromagnet structure according to claim 1, which comprises a stator laminated core, and wherein said star is in direct mechanical contact with said stator laminated core.

5. The electromagnet structure according to claim 1, wherein each of said receiving arrangements extends axially and tangentially, said receiving arrangements are arranged substantially along a helical line, and said receiving arrangements are separate from said coil bodies.

6. The electromagnet structure according to claim 5, wherein said receiving arrangements are arranged adjacent one another at least in part in the axial direction.

7. The electromagnet structure according to claim 5, wherein said receiving arrangements are spaced in the axial direction with respect to said coil windings at least in sections.

8. The electromagnet structure according to claim 1, configured for an adjustment drive of a motor vehicle.

9. An electric machine, comprising an electromagnet structure according to claim 1.

10. The electric machine according to claim 9 being an adjustment drive of a motor vehicle.

11. The electromagnet structure according to claim 1, wherein said guiding plate is a single part hollow cylinder, said hollow cylinder having radial projections integrally formed thereon and projecting therefrom radially outward to form a star shape.

* * * * *

UNITED STATES PATENT AND TRADEMARK OFFICE
CERTIFICATE OF CORRECTION

| | | |
|---|---|---|
| PATENT NO. | : 10,547,227 B2 | Page 1 of 1 |
| APPLICATION NO. | : 15/262043 | |
| DATED | : January 28, 2020 | |
| INVENTOR(S) | : Peter Hauck et al. | |

It is certified that error appears in the above-identified patent and that said Letters Patent is hereby corrected as shown below:

On the Title Page

Item (72) The second and third inventor's information should read:
Oliver Haupt, Wuerzburg, (DE); Maximilian Knopf, Muenchen, (DE);

Signed and Sealed this
Twenty-first Day of April, 2020

Andrei Iancu
*Director of the United States Patent and Trademark Office*